United States Patent
Zhang et al.

(10) Patent No.: US 9,321,325 B2
(45) Date of Patent: Apr. 26, 2016

(54) ELECTRIC VEHICLE AND THERMAL MANAGEMENT SYSTEM THEREOF

(75) Inventors: Rongrong Zhang, Hangzhou (CN); Yu He, Hangzhou (CN); Hui Wang, Hangzhou (CN); Jianmin Zhang, Hangzhou (CN); Chuliang Shi, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 877 days.

(21) Appl. No.: 13/204,826

(22) Filed: Aug. 8, 2011

(65) Prior Publication Data

US 2012/0031140 A1 Feb. 9, 2012

(30) Foreign Application Priority Data

Aug. 9, 2010 (CN) .......................... 2010 1 0253778

(51) Int. Cl.
*B60H 1/00* (2006.01)
*B60H 1/14* (2006.01)
*B60K 11/02* (2006.01)

(52) U.S. Cl.
CPC ................ *B60H 1/143* (2013.01); *B60K 11/02* (2013.01); *B60H 1/00278* (2013.01); *B60H 1/00385* (2013.01); *B60H 2001/00307* (2013.01)

(58) Field of Classification Search
CPC ................ B60H 2001/00114; B60H 1/00278; B60H 2001/00307; B60H 1/00392; B60H 1/00385; B60H 1/00007; B60H 1/00271
USPC ......................................... 62/498, 323.3, 244
See application file for complete search history.

(56) References Cited

U.S. PATENT DOCUMENTS

| 5,316,074 | A | * | 5/1994 | Isaji et al. ........................ 165/43 |
| 5,971,290 | A | * | 10/1999 | Echigoya et al. ........ 237/12.3 B |
| 7,669,647 | B2 | * | 3/2010 | Tsubone et al. .............. 165/202 |
| 8,800,313 | B2 | * | 8/2014 | Woo et al. ........................ 62/336 |

(Continued)

FOREIGN PATENT DOCUMENTS

| CN | 1606512 A | 4/2005 |
| CN | 101279580 A | 10/2008 |
| FR | 2965516 A1 * | 4/2012 |

OTHER PUBLICATIONS

The first Office Action issued on Oct. 10, 2014 regarding a Chinese counterpart application, application No. 201110207985.1.

*Primary Examiner* — Ljiljana Ciric
*Assistant Examiner* — Alexis Cox
(74) *Attorney, Agent, or Firm* — Kilpatrick Townsend & Stockton LLP

(57) ABSTRACT

A thermal management system for an electric vehicle includes a device for cooling one or more heat generating components, an in-cabin heat exchanger, and a heat pump device. The heat pump device includes a compressor, a first heat exchanger, a throttling element, and a second heat exchanger which are connected through pipelines and form a first loop. The first heat exchanger and the second heat exchanger are both dual channel exchangers. The device for cooling one or more heat generating components forms a second loop with the second channel of the first heat exchanger, and forms a third loop with the second channel of the second heat exchanger. The in-cabin heat exchanger forms a fourth loop with the second channel of the second heat exchanger. Only one of the second, third, and fourth loops is not shut off at any given time.

7 Claims, 6 Drawing Sheets

(56) References Cited

U.S. PATENT DOCUMENTS

| | | | |
|---|---|---|---|
| 2002/0100290 A1* | 8/2002 | Herta et al. | 62/434 |
| 2003/0164001 A1* | 9/2003 | Vouzelaud et al. | 62/244 |
| 2004/0050089 A1* | 3/2004 | Amaral | 62/324.1 |
| 2004/0089014 A1* | 5/2004 | Amaral et al. | 62/324.1 |
| 2004/0187506 A1* | 9/2004 | Iwanami et al. | 62/236 |
| 2004/0216483 A1* | 11/2004 | Inaba et al. | 62/498 |
| 2004/0261447 A1* | 12/2004 | Matsuoka et al. | 62/498 |
| 2005/0039878 A1* | 2/2005 | Meyer et al. | 165/42 |
| 2005/0103487 A1 | 5/2005 | Aflekt et al. | |
| 2005/0274139 A1* | 12/2005 | Wyatt | 62/498 |
| 2006/0073050 A1* | 4/2006 | Iwanami et al. | 418/3 |
| 2006/0080985 A1* | 4/2006 | Inaba et al. | 62/238.6 |
| 2006/0254309 A1* | 11/2006 | Takeuchi et al. | 62/501 |
| 2007/0289326 A1* | 12/2007 | Nishikawa et al. | 62/498 |
| 2008/0250804 A1* | 10/2008 | Kubo et al. | 62/241 |
| 2008/0289354 A1* | 11/2008 | Dudley et al. | 62/335 |
| 2009/0293525 A1* | 12/2009 | Monforte | 62/244 |
| 2010/0095700 A1* | 4/2010 | Bush et al. | 62/323.3 |
| 2010/0243751 A1* | 9/2010 | Bouysset et al. | 237/12.3 R |
| 2011/0146318 A1* | 6/2011 | Wittmann et al. | 62/238.7 |
| 2011/0154844 A1* | 6/2011 | Lee et al. | 62/278 |
| 2011/0197599 A1* | 8/2011 | Stewart et al. | 62/56 |
| 2011/0247350 A1* | 10/2011 | Awwad et al. | 62/115 |
| 2013/0206360 A1* | 8/2013 | Zhang et al. | 165/42 |
| 2014/0053584 A1* | 2/2014 | Tschismar | 62/115 |

* cited by examiner

ELECTRIC VEHICLE AND THERMAL MANAGEMENT SYSTEM THEREOF

FIELD OF INVENTION

The present invention relates to the field of heat distribution technique, and particularly to a thermal management system. The present invention also relates to an electric vehicle including the thermal management system.

BACKGROUND OF THE INVENTION

Due to its advantages of energy conservation and environmental protection, electric vehicles have become the trend of development of automobiles in the future.

As the development of automobiles, people pay more and more attention to the comfort inside the cabin. A conventional internal combustion engine vehicle utilizes waste heat of an internal combustion engine and heat from exhaust gas of the engine to heat the cabin. In normal driving state the temperature of circulating water in the internal combustion engine vehicle is generally above 80 degrees, which may basically meet heating requirements of the cabin under various conditions. However, the power of an electric vehicle is mainly provided by a motor, and the temperature of cooling circulating water in the electric vehicle is only 50 degrees, and the amount of heat is very small. On the other hand, multiple heat generating components are provided inside the electric vehicle, such as a motor frequency converter and batteries, which need to be cooled by using corresponding heat dissipation devices, for ensuring that the heat generating components can operate within an allowable temperature range.

In the prior art, in order to keep the temperature inside the cabin of an electric vehicle at a level comfortable for human body, a variety of ways have been used in the prior art to provide heat for the cabin, such as: 1. using an independent heat source, i.e., heating with PTC or fuels, such as gasoline, kerosene, and ethanol; 2. recovering the waste heat of components assisted with the independent heat source; 3. using a heat pump to ensure that the temperature inside the cabin is always kept within a comfortable temperature range. On the other hand, in order to ensure that the heat generating components operate within a normal temperature range, an air-cooled radiator cooperated with water circulation is usually adopted to cool the components in the prior art.

However, more energy of batteries would be consumed, thereby reducing the driving mileage of the vehicle if the independent heat source among the above various heating ways, such as PTC, is used to provide heat. If the fuel is used to provide heat, not only the heating efficiency is low, but also the environment would be polluted and the load of the vehicle would be increased. Besides, since a separate radiator is needed for cooling the heat generating components, not only the heat is not utilized efficiently but also the cooling effect for the heat generating components is also poor in the case of high environmental temperature, and therefore, the heat generating components may not be controlled to operate under an optimum temperature. In case of recovering the waste heat of devices assisted with the independent heat source, although the heat from the heat generating components is utilized, the problem resulted from the independent heat source still exist and the problem of cooling the heat generating components still exist. If the heat pump is used to adjust the temperature in the cabin, the problem of utilizing the heat of the heating elements and the problem of cooling the heating elements still exist.

Therefore, it has become technical problems to be solved by those skilled in the art that how to improve the reasonableness of using the heat from heat generating components of the electric vehicle and the cooling effect of the heat generating components and how to improve the comfort in the cabin of the electric vehicle so as to achieve the overall management of the heat system of the electric vehicle.

SUMMARY OF THE INVENTION

An object of the present invention is to provide a thermal management system, which is able to ensure full use of the heat from heat generating components in an electric vehicle and to decrease the waste of heat, and to improve the cooling effect of the heat generating components and the comfort of the cabin. Another object of the present invention is to provide an electric vehicle including the thermal management system.

To solve the above technical problems, the present invention provides a thermal management system for the electric vehicle, comprising a heat generating component cooling device and a heat pump device.

The heat pump device comprises a compressor, a first heat exchanger, a throttling element and a second heat exchanger, which are connected through pipelines and form a loop, and refrigerant is circulated in the pipelines.

The first heat exchanger and the second heat exchanger are both dual channel exchangers, two channels of the first heat exchanger and the second heat exchanger are sealed and isolated respectively, first channels of the first heat exchanger and the second heat exchanger communicate with other components of the heat pump device through pipelines respectively, the heat generating component cooling device communicates with second channels of the first heat exchanger and the second heat exchanger respectively to form loops which can be closed, and the two loops formed by the heat generating component cooling device with the first heat exchanger and the second heat exchanger respectively are open alternatively.

Preferably, the thermal management system further comprises a first air-cooled heat exchanger, wherein the first air-cooled heat exchanger communicates with the heat generating component cooling device through pipelines to form a loop which can be closed, and at least one of the three loops formed by the heat generating component cooling device and the first air-cooled heat exchanger, by the heat generating component cooling device and the first heat exchanger, and by the heat generating component cooling device and the second heat exchanger respectively is open.

Preferably, the thermal management system further comprises an in-cabin heat exchanger, wherein the in-cabin heat exchanger communicates with the second channel of the second heat exchanger and the heat generating component cooling device through pipelines respectively to form loops which can be closed, and at least one of the four loops formed by the heat generating component cooling device and the first air-cooled heat exchanger, by the heat generating component cooling device and the in-cabin heat exchanger, by the heat generating component cooling device and the first heat exchanger, and by the heat generating component cooling device and the second heat exchanger respectively is open.

Preferably, a second pump is provided in a pipeline of the second channel of the first heat exchanger, and a second accumulator is provided in an inlet pipeline of the second channel of the first heat exchanger.

Preferably, the first heat exchanger comprises a secondary heat exchanger and a primary heat exchanger which are connected in series, a second channel of the primary heat exchanger communicates with the first air-cooled heat exchanger to form a loop, the second accumulator and the second pump are provided in an inlet pipeline of the second channel of the primary heat exchanger, a second air-cooled heat exchanger is connected in a second channel of the secondary heat exchanger, and a third accumulator and a third pump are provided in an inlet pipeline of the second channel of the secondary heat exchanger.

A first three-way valve is provided in an outlet pipeline of the first air-cooled heat exchanger, a first valve port of the first three-way valve communicates with the outlet pipeline of the first air-cooled heat exchanger, a second valve port of the first three-way valve communicates with an inlet pipeline of the first air-cooled heat exchanger, and a third valve port of the first three-way valve communicates with an inlet pipeline of the heat generating component cooling device.

The first air-cooled heat exchanger communicates with the second channel of the first heat exchanger through pipelines to form a loop, the inlet pipeline of the second channel of the first heat exchanger communicates with an outlet pipeline of the heat generating component cooling device, and an outlet pipeline of the second channel of the first heat exchanger communicates with the second valve port of the first three-way valve and the inlet pipeline of the first air-cooled heat exchanger respectively.

A fourth regulating valve is connected between the third valve port of the first three-way valve and the inlet pipeline of the heat generating component cooling device, a sixth regulating valve is connected between the inlet pipeline of the second channel of the first heat exchanger and the pipeline connecting the third valve port of the first three-way valve and the fourth regulating valve, and a fifth regulating valve is connected between the outlet pipeline of the heat generating component cooling device and the inlet pipeline of the second channel of the first heat exchanger.

Preferably, the thermal management system further comprises the in-cabin heat exchanger, wherein the in-cabin heat exchanger communicates with the second channel of the second heat exchanger and the heat generating component cooling device through pipelines respectively to form loops which can be closed, and at least one of the three loops formed by the heat generating component cooling device and the in-cabin heat exchanger, by the heat generating component cooling device and the first heat exchanger, and by the heat generating component cooling device and the second heat exchanger respectively is open.

Preferably, a control valve is provided in the inlet pipeline of the heat generating component cooling device, and a first pump is provided in a pipeline of the second heat exchanger and a first accumulator is provided in an inlet pipeline of the second heat exchanger.

Preferably, an inlet pipeline of the in-cabin heat exchanger communicates with an outlet pipeline of the second heat exchanger, an outlet pipeline of the in-cabin heat exchanger communicates with the inlet pipeline of the heat generating component cooling device, an outlet pipeline of the second channel of the second heat exchanger communicates with the inlet pipeline of the in-cabin heat exchanger through a second three-way valve, the inlet pipeline of the heat generating component cooling device located at the downstream side of the outlet pipeline of the in-cabin heat exchanger communicates with the outlet pipeline of the heat generating component cooling device through pipelines which can be closed, and a third valve port of the second three-way valve communicates with the outlet pipeline of the in-cabin heat exchanger through pipelines.

The in-cabin heat exchanger and the heat generating component cooling device are connected through pipelines with regulating valves, an optional connection between the heat generating component cooling device and the in-cabin heat exchanger is achieved by the regulating valves, the regulating valves comprise a first regulating valve, a second regulating valve and a third regulating valve, the third regulating valve is provided in the connection pipelines for open or close the connection pipelines, the first regulating valve is connected between a first end of the third regulating valve and the inlet pipeline of the heat generating component cooling device, and the second regulating valve is connected between a second end of the third regulating valve and the outlet pipeline of the heat generating component cooling device.

Preferably, the heat generating component cooling device is heat generating component heat exchangers comprising a frequency converter heat exchanger, a battery heat exchanger and an engine heat exchanger which are connected in parallel.

For solving the above technical problems, the present invention also provides an electric vehicle comprising a cabin and a thermal management system which is any one of the thermal management systems described above.

The thermal management system for the electric vehicle provided by the present invention may cool the heat generating components in three ways: 1. heat exchange between coolant in the second channel of the second heat exchanger and low-temperature refrigerant in the first channel of the second heat exchanger; 2. heat exchange between coolant in the second channel of the first heat exchanger and low-temperature refrigerant in the first channel of the first heat exchanger; 3. heat exchange between the heat generating components and medium in a loop formed by the first air-cooled heat exchanger and the heat generating components; 4. the fluid in the loop formed by the heat generating component heat exchanger and the in-cabin heat exchanger flows through the in-cabin heat exchanger and the heat generating component cooling device for increasing the temperature in the cabin and decreasing the temperature of the heat generating components.

The heat generating component cooling device may selectively exchange heat with at least one of the second channel of the second heat exchanger, the second channel of the first heat exchanger, the first air-cooled heat exchanger and the in-cabin heat exchanger. Multiple regulating valves and three-way valves are provided in the thermal management system of the present invention for regulating the open/close mode of the pipelines so as to achieve the connection of the pipelines in different working conditions.

When the cabin of the electric vehicle needs to be cooled, the heat generating components are cooled in the first way. In the process of the refrigerant flowing along a loop of the heat pump device under the action of the compressor, high-temperature refrigerant is flowing in the first channel of the first heat exchanger and low-temperature refrigerant is flowing in the first channel of the second heat exchanger. Through two channels of the first heat exchanger, heat exchange between the high-temperature refrigerant and the out-cabin components (including the air-cooled heat exchangers and external environment) can be achieved so as to decrease the temperature of the high-temperature refrigerant flowing out from the first channel of the first heat exchanger. Further the temperature of the refrigerant is decreased through a throttling element, the low-temperature refrigerant enters into the first channel of the second heat exchanger, the different fluids in the two channels of the second heat exchanger exchanges heat so as to decrease the temperature in the cabin and cool the heat generating components.

Preferably, the low-temperature refrigerant flowed out from the in-cabin heat exchanger can be used to cool the heat generating components. In this way, the temperatures of the inside of the cabin and the heat generating components can both be decreased and the cooling residual capacity of the in-cabin heat exchanger can be recovered which obtains the maximized utilization of the cooling capacity of the refrigerant.

Preferably, after cooling the heat generating components with the coolant in the heat generating component cooling device, the first air-cooled heat exchanger exchanges heat with the external environment so as to decrease the temperature of the coolant.

When the electric vehicle needs to be heated, the heat generating components can be cooled in the second way. In the process of the refrigerant flowing along the loop of the heat pump device under the action of the compressor, low-temperature refrigerant is flowing in the first channel of the first heat exchanger and high-temperature refrigerant is flowing in the first channel of the second heat exchanger. Through, heat exchange between fluids in two channels of the second heat exchanger increases the temperature inside the cabin. Further the temperature of the refrigerant is decreased through the throttling element, the low-temperature refrigerant enters into the first channel of the first heat exchanger, the low-temperature refrigerant exchanges heat with the out-cabin components (including the air-cooled heat exchangers and external environment) through the two channels of the first heat exchanger exchanges heat so as to cool the heat generating components.

Preferably, the low-temperature refrigerant flowed out from the in-cabin heat exchanger can be used to cool the heat generating components. In this way, the temperatures of the inside of the cabin and the heat generating components can both be decreased and the cooling residual capacity of the in-cabin heat exchanger can be recovered which obtains the maximized utilization of the cooling capacity of the refrigerant.

Preferably, after cooling the heat generating components with the coolant in the heat generating component cooling device, the first air-cooled heat exchanger exchanges heat with the external environment so as to decrease the temperature of the coolant.

When the electric vehicle needs to be heated, the heat generating components can be cooled in the fourth way. Fluids in the loop formed by the heat generating component heat exchanger and the in-cabin heat exchanger flows through the heat generating component cooling device and the in-cabin heat exchanger so as to increase the temperature inside the cabin and decrease the temperature of the heat generating components at the same time. This way is applicable in this situation that, when the temperature of the cabin is low, the heating requirement of the cabin can be satisfied by using the heat of the heat generating components through connecting the loop formed by the in-cabin heat exchanger and the heat generating components, without using the air conditioning system. This cooling way of the heat generating components fully utilizes the heat of the heat generating components and also satisfies the comfort requirement of the cabin. The fourth way can be used together with the first way and/or the third way to cool the heat generating components.

When the electric vehicle does not need to be cooled or heated, the heat generating components can be cooled in the third way. The third way can also be used together with the other three ways to cool the heat generating components.

Multiple control valves, accumulators and pumps are provided in the thermal management system of the present invention. The pumps are used to provide power for the fluids flowing in the circulation loop, the first function of the accumulators is to prevent the volume change of the fluids caused by the expansion with heat and contraction with cold in different temperatures and to supply the fluid loss in the circulation process, the second function of the accumulators is to reserve enough fluid for loops so as to prevent the bubbles from creating in the pipelines, the third function of the accumulators is to release the bubbles created in the circulation process, and the control valve is used to control the fluid flow of the pipelines based on various wording conditions.

Beneficial effects of the electric vehicle according to the present invention are the same as those of the thermal management system described above, which will not be discussed in detail herein.

DETAILED DESCRIPTION OF THE INVENTION

Figure 1:
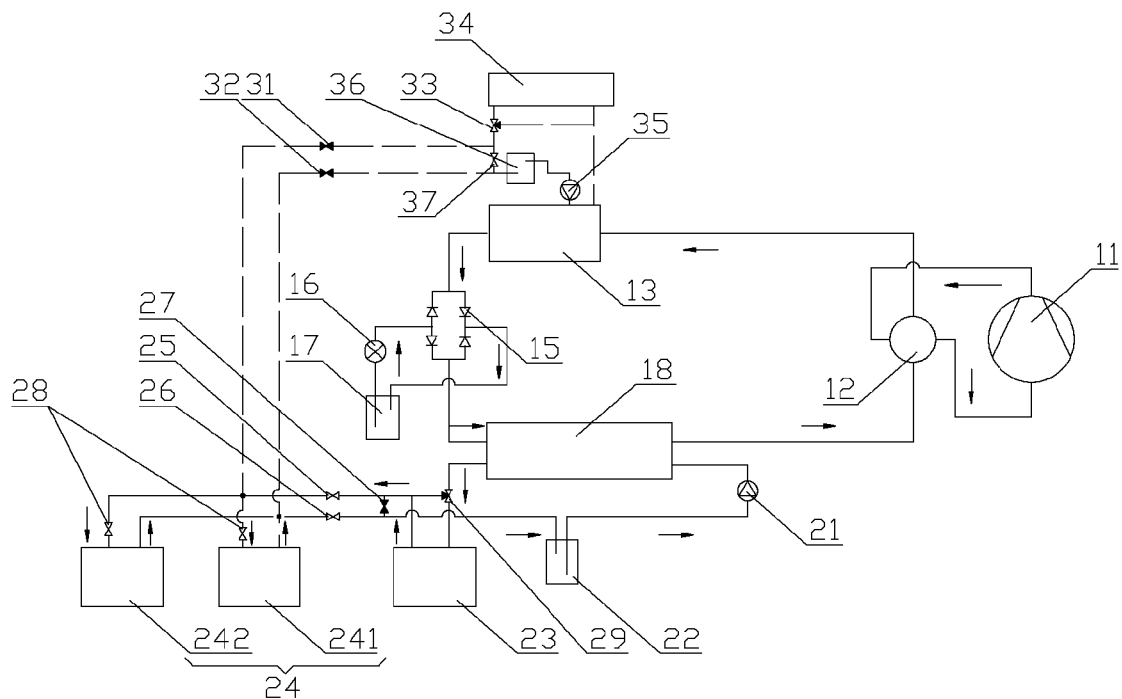
FIG. 1 is a structural diagram of a thermal management system according to a first embodiment of the present invention in a first operation mode.

The present invention provides a thermal management system, which is able to ensure full use of the heat from heat generating elements in an electric vehicle, to reduce the waste of heat, and to improve the cooling effect of the heat generating elements and comfort inside the cabin. The present invention further provides an electric vehicle including the above thermal management system.

In order to make the solution of the present invention better understood by the skilled in the art, the present invention is described further in detail in conjunction with accompanying drawings and detailed description of embodiments hereinafter.

Referring to FIGS. 1-6, a thermal management system for the electric vehicle provided by the present invention comprises a heat generating component cooling device and a heat pump device, wherein the heat pump device comprises a compressor 11, a first heat exchanger 13, a throttling element 16 and a second heat exchanger 18 which are connected through pipelines and form a loop, and refrigerant is circulated in the pipelines.

The compressor 11 provides power for the circulation of the refrigerant. Because that the outlet of the compressor 11 is not changeable, a four-way valve 12 is provided in the loop, through the connection between the different valve ports of the four-way valve 12 the flowing direction of the refrigerant in the refrigerant loop is changed so as to satisfy the requirement of cooling and heating. Because of that the amount of the fluid circulated in the loop on a cooling condition is different that on a heating condition, an accumulator 17 is further provided in the loop. Because of that the inlet and outlet of the accumulator 17 is not changeable, a one-way valve manifolds 15 is provided in the loop to satisfy the changing of the flowing direction of the refrigerant and to ensure that the refrigerant always flow into the inlet of the accumulator 17 and flow out from the outlet of the accumulator 17 no matter how the accumulator 17 flows. The throttling element 16 is provided to decrease the temperature of the refrigerant.

In detail, the throttling element 16 can be an electric expansion valve or other elements having cooling effect. The throttling element 16, the accumulator 17 and the one-way valve manifolds 15 can be connected in the refrigerant loop in the way as shown in the drawings.

In this way, in working process, when the heat generating components and the cabin need to be cooled at the same time, as shown in FIG. 1, the four-way valve 12 is set at a cooling position, the refrigerant flows out along the pipelines with high temperature and high pressure under the action of the compressor 11, then passes through the four-way valve 12 and reaches the first heat exchanger 13, then reaches the one-way valve manifolds 15, the accumulator 17, and then is cooled when passing through the throttling element 16. The low-temperature refrigerant reaches the second heat exchanger 18 and exchanges heat with the heat generating component cooling device in the second heat exchanger 18. When flowing through a heat generating component heat exchanger 24 and an in-cabin heat exchanger 23, the coolant of the heat generating component cooling device absorbs heat from the heat generating components and cabin and brings the heat into the second heat exchanger 18, the low-temperature coolant after heat exchange enters into the next cycle for achieving the purpose of cooling.

In the present invention, the heat generating component cooling device includes multiple heat generating component heat exchangers 24 which are connected in series. In the electric vehicle the heat generating component heat exchanger 24 can be a frequency converter heat exchanger 242, a battery heat exchanger 241, an engine heat exchanger and etc. The heat generating component cooling device can also includes other heat generating components needed to be cooled, for example the engine heat exchanger (which is not shown in the drawings).

In detail, alternatively, the frequency converter heat exchanger 242, the battery heat exchanger 241 and the engine heat exchanger can be connected in parallel.

Because the normal working temperature of each heat generating component is not identical to another, if the heat generating component heat exchangers are connected in parallel, a control valve 28 can be connected in each loop of the frequency converter heat exchanger 242, the battery heat exchanger 241 and the engine heat exchanger for controlling each heat generating component separately and ensuring that each heat generating component works in the normal temperature range.

Alternatively, the frequency converter heat exchanger 242, the battery heat exchanger 241 and the engine heat exchanger can be connected in series.

In the present invention, the first heat exchanger 13 and the second heat exchanger 18 are both dual channel exchanger, and two channels of the first heat exchanger and the second heat exchanger are sealed and isolated respectively. Two isolated fluids are circulated in the two channels and exchange heat when flowing through the heat exchanger.

First channels of the first heat exchanger 13 and the second heat exchanger 18 communicate respectively with other components of the heat pump device through pipelines. The heat generating component cooling device communicates with second channels of the first heat exchanger 13 and the second heat exchanger 18 respectively to form loops, and the two loops formed by the heat generating component cooling device with the first heat exchanger 13 and the second heat exchanger 18 respectively can be open alternatively.

The thermal management system of the present invention is further provided with the in-cabin heat exchanger 23 which communicates with the second channel of the second heat exchanger 18 to form loops which can be closed. At least one of the three loops formed by the heat generating component cooling device and the in-cabin heat exchanger 23, by the heat generating component cooling device and the first heat exchanger 13, and by the heat generating component cooling device and the second heat exchanger 18 respectively is open.

Preferably, the inlet pipeline of the in-cabin heat exchanger 23 communicates with an outlet pipeline of the second heat exchanger 18. The outlet pipeline of the in-cabin heat exchanger 23 communicates with an inlet pipeline of the heat generating component cooling device. An outlet pipeline of the second channel of the second heat exchanger 18 communicates with the inlet pipeline of the in-cabin heat exchanger 23 through a second three-way valve 29. The inlet pipeline of the heat generating component cooling device located at the downstream side of the outlet pipeline of the in-cabin heat exchanger 23 communicates with an outlet pipeline of the heat generating component cooling device through pipelines which can be closed. A third valve port of the second three-way valve 29 communicates with the outlet pipeline of the in-cabin heat exchanger 23 through pipelines.

Preferably, the in-cabin heat exchanger 23 and the heat generating component cooling device is connected through pipelines with regulating valves, and an optional connection between the heat generating component cooling device and the in-cabin heat exchanger 23 is achieved by the regulating valves.

The regulating valves comprise a first regulating valve 25, a second regulating valve 26 and a third regulating valve 27. Preferably, the regulating valve 25 is a stop valve. The third regulating valve 27 is provided at the connection pipelines for open or close the connection pipelines, the first regulating valve 25 is connected between a first end of the third regulating valve 27 and the inlet pipeline of the heat generating component cooling device, and the second regulating valve 26 is connected between a second end of the third regulating valve 27 and the outlet pipeline of the heat generating component cooling device.

Preferably, a control valve 28 is provided in the inlet pipeline of the heat generating component cooling device, and a first pump 21 is provided in a pipeline of the second heat exchanger 18 and a first accumulator 22 is provided in an inlet pipeline of the second heat exchanger 18.

The thermal management system for the electric vehicle in the present invention further comprises a first air-cooled heat exchanger 34, which communicates with the heat generating component cooling device through pipelines to form a loop which can be closed. At least one of the three loops formed by the heat generating component cooling device and the first air-cooled heat exchanger 34, by the heat generating component cooling device and the first heat exchanger 13, and by the heat generating component cooling device and the second heat exchanger 18 respectively is open. Or at least one of the four loops formed by the heat generating component cooling device and the first air-cooled heat exchanger 34, by the heat generating component cooling device and the in-cabin heat exchanger 23, by the heat generating component cooling device and the first heat exchanger 13, and by the heat generating component cooling device and the second heat exchanger 18 respectively is open.

A first three-way valve 33 is provided in an outlet pipeline of the first air-cooled heat exchanger 34, and a first valve port of the first three-way valve 33 communicates with the outlet pipeline of the first air-cooled heat exchanger 34, a second valve port of the first three-way valve 33 communicates with the inlet pipeline of the first air-cooled heat exchanger 34, and a third valve port of the first three-way valve 33 communicates with the inlet pipeline of the heat generating component cooling device.

The first air-cooled heat exchanger 34 communicates with the second channel of the first heat exchanger 13 through pipelines to form a loop.

An inlet pipeline of the second channel of the first heat exchanger 13 communicates with the outlet pipeline of the heat generating component cooling device, an outlet pipeline of the second channel of the first heat exchanger 13 communicates with the second valve port of the first three-way valve 33 and the inlet pipeline of the first air-cooled heat exchanger 34 respectively.

A fourth regulating valve 31 is connected between the third valve port of the first three-way valve 33 and the inlet pipeline of the heat generating component cooling device, a sixth regulating valve 37 is connected between the inlet pipeline of the second channel of the first heat exchanger 13 and the pipeline connecting the third valve port of the first three-way valve 33 and the fourth regulating valve 31, and a fifth regulating valve 32 is connected between the outlet pipeline of the heat generating component cooling device and the inlet pipeline of the second channel of the first heat exchanger 13.

Figure 6:
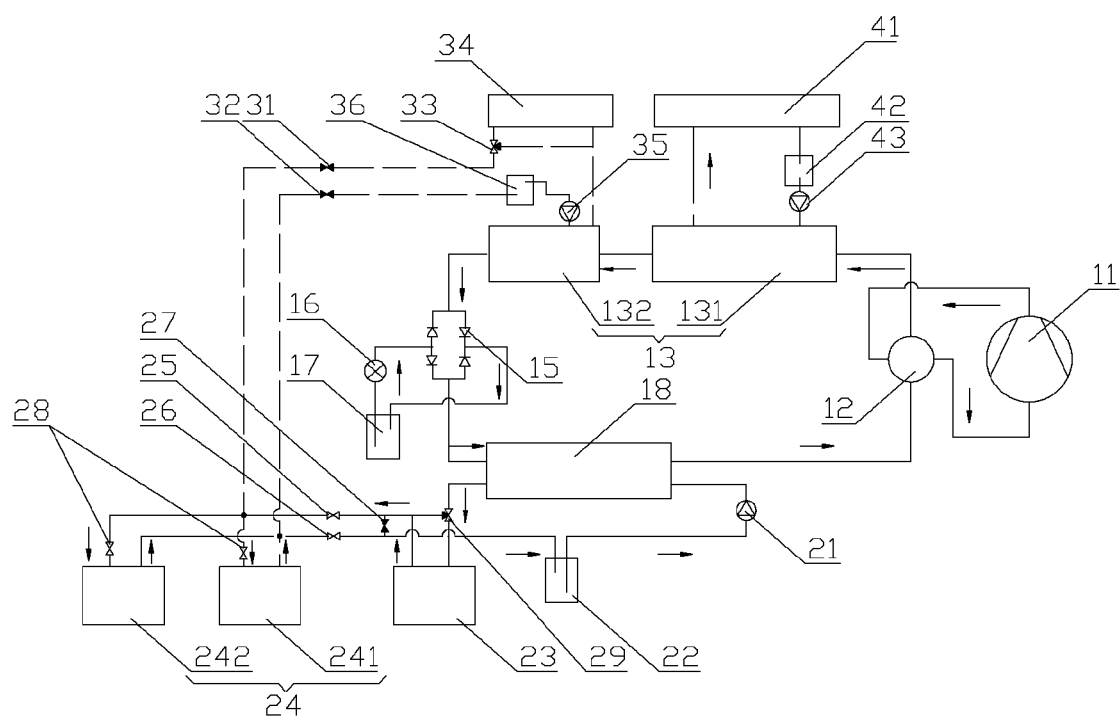
FIG. 6 is a structural diagram of a thermal management system according to a second embodiment of the present invention in a first operation mode.

Referring FIG. 6, the first heat exchanger 13 comprises a secondary heat exchanger 131 and a primary heat exchanger 132 connected in series, a second channel of the primary heat exchanger 132 communicates with the first air-cooled heat exchanger 34 to form a loop, and a second channel of the secondary heat exchanger 131 is connected with a second air-cooled heat exchanger 41.

A second accumulator 36 and a second pump 35 are provided in an inlet pipeline of the second channel of the primary heat exchanger 132, and a third accumulator 42 and a third pump 43 are provided in an inlet pipeline of the second channel of the secondary heat exchanger 131.

In an embodiment as shown in FIG. 1, the heat pump is in cooling state. The heat generating component cooling device cools the heat generating components through heat exchange between the medium in the second channel of the second heat exchanger 18 and the low-temperature refrigerant in the first channel of the second heat exchanger 18.

In detail, referring to FIG. 1, the first regulating valve 25 and the second regulating valve 26 are open, the third regulating valve 27 is closed, a first valve port and a second valve port of the second three-way valve 29 are open, and the third valve port of the second three-way valve 29 is closed. Refrigerant is filled in the pipelines of the heat pump device, the refrigerant flows in the pipelines under the action of the compressor 11, and in the flowing process, high-temperature refrigerant is flowing in the first channel of the first heat exchanger 13, low-temperature refrigerant is flowing in the first channel of the second heat exchanger 18. After flowing out from the compressor 11 the refrigerant enters into the first heat exchanger 13. The refrigerant exchanges heat with the out-cabin components (including the air-cooled heat exchangers and external environment) through the first heat exchanger 13. Then through the throttling action of the throttling 16 the temperature of the refrigerant is decreased. In the second heat exchanger 18, the refrigerant in the first channel of the second heat exchanger 18 exchanges heat with the coolant in the second channel of the second heat exchanger 18. Then coolant flows through and exchanges heat with the heat generating component cooling device and the in-cabin heat exchanger 23 so as to decrease the temperature inside the cabin and cool the heat generating components.

The coolant in the pipelines of the heat generating component cooling device flows under the action of a power component (usually is a water pump, and in the present invention is the first pump 21).

The first valve port and the third valve port of the first three-way valve 33 are open, the second valve port of the first three-way valve 33 is closed, the loop formed by the first air-cooled heat exchanger 34 and the second channel of the first heat exchanger 13 is open. When the refrigerant with high temperature and high pressure flows through the first channel of the first heat exchanger 13, the coolant flows through the second channel of the first heat exchanger 13 and the first air-cooled heat exchanger 34 respectively under the action of the second pump 35, so that the refrigerant and the coolant exchanges heat in the first heat exchanger 13 so as to decrease the temperature of the refrigerant.

In the second and the third embodiments, the first regulating valve 25 and the second regulating valve 26 are closed, the third regulating valve 27 is open, the first valve port and the second valve port of the second three-way valve 29 are open, the third valve port of the second three-way valve 29 is closed, the fourth regulating valve 31 and the fifth regulating 32 are open and a sixth regulating valve 37 is closed. The heat pump is in heating state. The heat generating component cooling device cools the heat generating components through heat exchange between the medium in the second channel of the first heat exchanger 13 and the low-temperature refrigerant in the first channel of the first heat exchanger 13.

Figure 2:
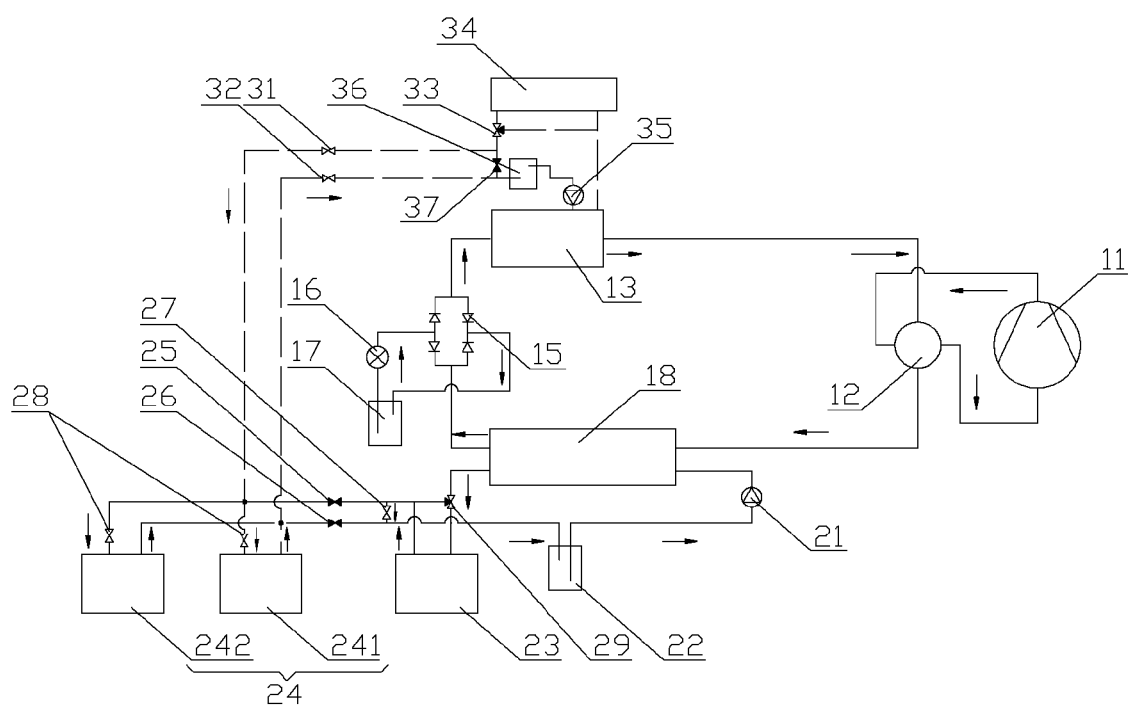
FIG. 2 is a structural diagram of the thermal management system as illustrated in FIG. 1 in a second operation mode.
Figure 3:
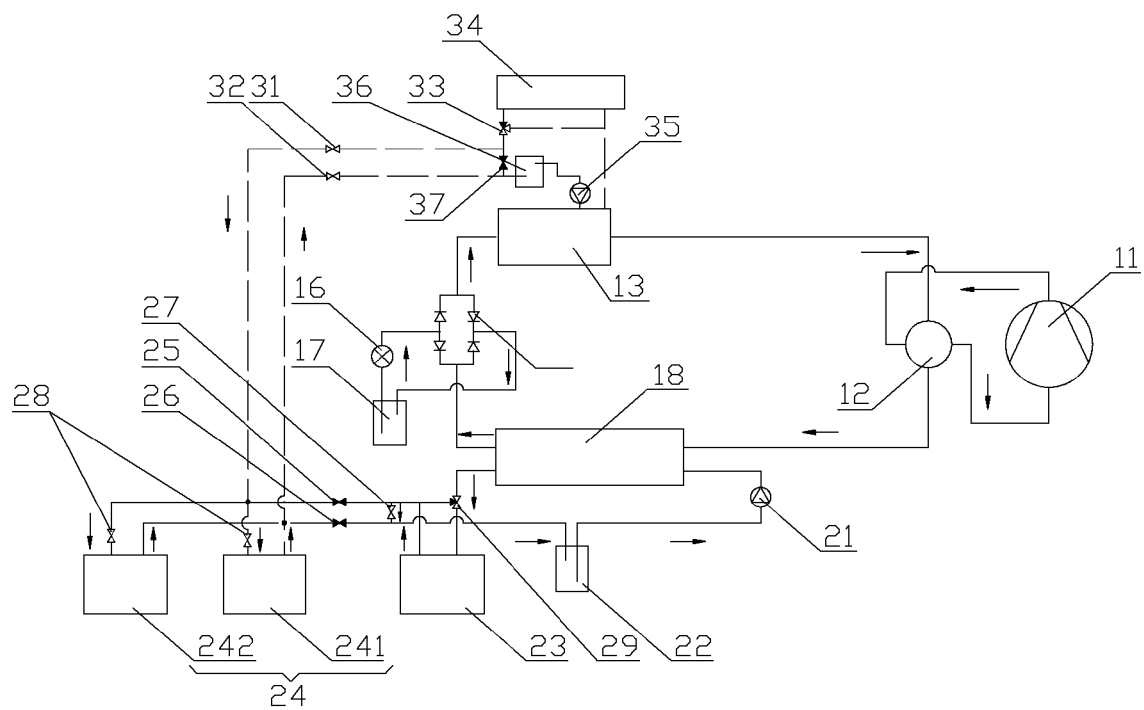
FIG. 3 is a structural diagram of the thermal management system as illustrated in FIG. 1 in a third operation mode.
Figure 4:
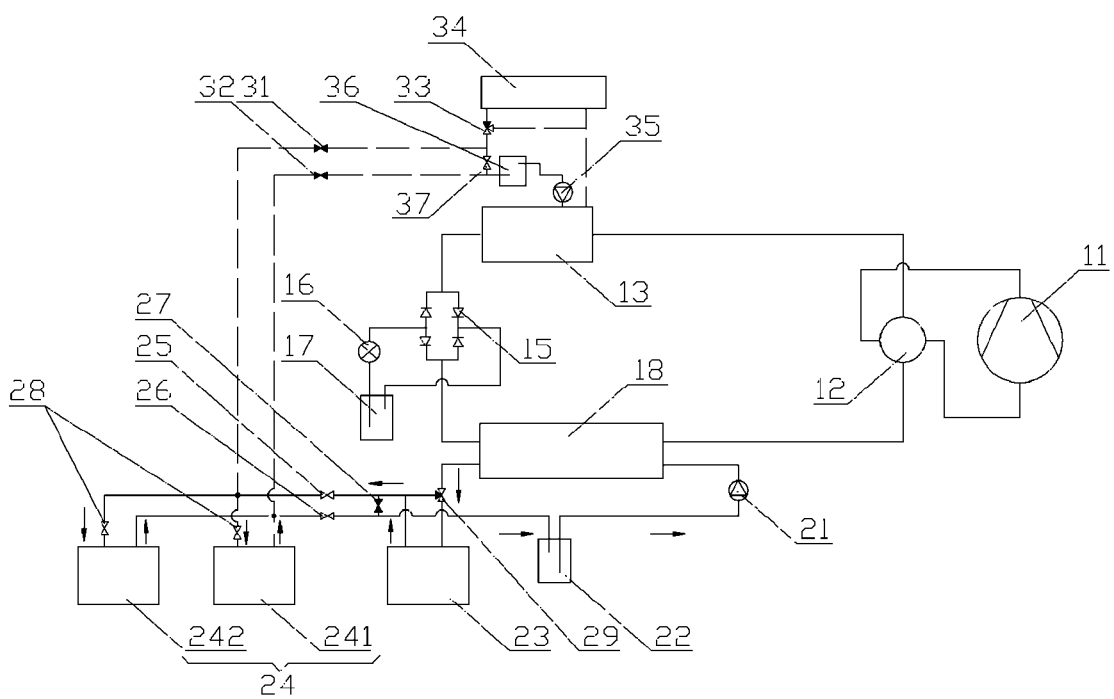
FIG. 4 is a structural diagram of the thermal management system as illustrated in FIG. 1 in a fourth operation mode.

In detail, referring to FIGS. 2 and 3, refrigerant is filled in the pipelines of the heat pump device, the refrigerant flows in the pipelines under the action of the compressor 11, and in the flowing process, low-temperature refrigerant is flowing in the first channel of the first heat exchanger 13, high-temperature refrigerant is flowing in the first channel of the second heat exchanger 18. After flowing out from the compressor 11 the refrigerant enters into the second heat exchanger 18. The high-temperature refrigerant in the first channel of the second heat exchanger 18 exchanges heat with the coolant in the second channel of the second heat exchanger 18, and the coolant passes through and exchanges heat with the in-cabin heat exchanger so as to increase the temperature inside the cabin. Then through the throttling action of the throttling 16 the temperature of the refrigerant is decreased. Then the refrigerant exchanges heat with the out-cabin components (including the air-cooled heat exchangers, the heat generating component cooling device and external environment) through the first heat exchanger 13, so as to achieve the cooling of the heat generating components.

On the other hand, the coolant in the pipelines of the heat generating component cooling device flows under the action of a power component (usually is a water pump, and in the present invention is the first pump 21 and the second pump 35). Referring to FIG. 2, the difference between the second embodiment and the third embodiment is that, in the second embodiment the first valve port and the third valve port of the first three-way valve 33 are open and the second valve port of the first three-way valve 33 is closed, in the third embodiment the second valve port and the third valve port of the first three-way valve 33 are open and the first valve port of the first three-way valve 33 is closed. In the second embodiment, in flowing process, the coolant removes the heat of the heat generating components through the first air-cooled heat exchanger 34 and the first heat exchanger 13 so as to cool the heat generating components. In the third embodiment, the coolant does not flow through the first air-cooled heat exchanger 34, but removes the heat of the heat generating components only through the first heat exchanger 13 so as to cool the heat generating components.

In the fourth embodiment, the heat pump device is in closed state. The loop formed by the in-cabin heat exchanger 23 and the heat generating component cooling device is open. Under the action of the first pump 21, the coolant in the heat generating component cooling device flows through the in-cabin heat exchanger and the heat generating component cooling device which enables the air in the cabin to exchange heat with the heat generating components indirectly so as to increase the temperature of the cabin and cool the heat generating components at the same time.

The implementation mean of this embodiment fully utilizes the heat of the heat generating components and also satisfy the comfort requirement of the cabin. But this embodiment is applicable in this situation that, when the temperature of the cabin is low, the heating requirement of the cabin can be satisfied by using the heat of the heat generating components through connecting the loop formed by the in-cabin heat exchanger and the heat generating components, without using the air conditioning system.

Figure 5:
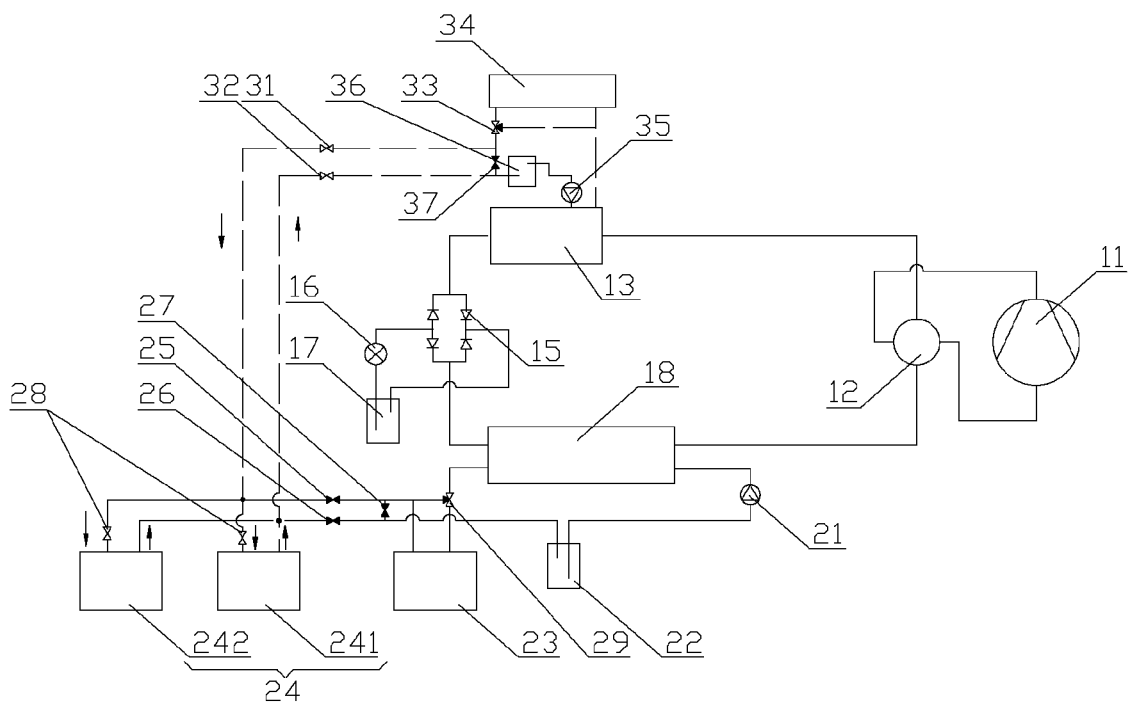
FIG. 5 is a structural diagram of the thermal management system as illustrated in FIG. 1 in a fifth operation mode.

The implementation mean of this embodiment can be used together with the second embodiment and the third embodiment when the air condition heating is needed to satisfy the heating requirement, in this way the heat of the heat generating components is also used to heat the cabin so as to decrease the consumption of the air condition, at the same time the comfort requirement of the cabin and the cooling requirement of the heat generating components are satisfied In the fifth embodiment, there is no need to heat or cool the cabin. Referring to FIG. 5, the heat pump device loop is closed, the coolant in the heat generating component cooling device flows through the heat generating component cooling device and the first air-cooled heat exchanger 34 under the action of the second pump 35 and which enables the air outside the cabin to exchange heat with the heat generating components indirectly, therefore cooling the heat generating components by using the difference between the temperature of the heat generating components and the outside temperature.

When the temperature in the cabin is relatively low, in order to better control the temperature inside the cabin and satisfy the cooling requirement of the heat generating components, the loop formed by the heat generating component cooling device and the in-cabin heat exchanger 23 can be open on the basis of this embodiment. In this way, after flowing through the heat generating component cooling device, a part of the coolant flows through the first air-cooled heat exchanger 34 under the action of the second pump 35 and exchanges heat with external environment. After the temperature of the coolant is decreased, the coolant flows through the heat generating component cooling device again. Another part of the coolant flows through the in-cabin heat exchanger 23 to exchange heat with the internal environment of the cabin. When the temperature of the coolant is decreased, the coolant flows through the heat generating component cooling device again. The circulation is repeated in this way, and the flow of the coolant in the two loops is controlled by the control valve 28.

This embodiment fully utilizes the heat of the heat generating components and also satisfies the comfort requirement of the cabin. But this embodiment is applicable in this situation that, the temperature of the cabin is low, the air conditioning system is not necessary and the heat provided by the heat generating components exceeds the heating requirement of the cabin. The heating requirement of the cabin and the cooling requirement of the heat generating components can be satisfied by using the heat of the first air-cooled heat exchanger and the heat generating components through connecting the loop formed by the in-cabin heat exchanger and the heat generating components and the loop formed by the first air-cooled heat exchanger and the heat generating component cooling device.

The core of the present invention is that, when flowing through the heat exchangers (which is the first heat exchanger 13 or the second heat exchanger 18) of the heat pump device, the coolant in the heat generating component heat exchanger 24 exchanges heat with the low-temperature refrigerant in the heat pump device to implement heat exchange between the heat pump device and the heat generating components.

Indeed, the heat pump of the automobile air-conditioner is not always in an operating state, and a proper way for exchanging heat may be selected as needed, so that the heat generating component heat exchanger 24 may exchange heat with the in-cabin heat exchanger 23, the first air-cooled heat exchanger 34, the first heat exchanger 13 and the second heat exchanger 18 as needed, so as to control the temperature of the heat generating components and the cabin under various circumstances and to meet the requirements for the heat generating components always operating within a normal temperature range and the temperature comfort in the cabin.

It can be seen that in the thermal management system according to the present invention, the heat generating component heat exchanger 24 and the in-cabin heat exchanger 23 may be utilized to transfer heat from the heat generating components towards the cabin, which improves the utilization efficiency of the heat and cools the heat generating components simultaneously. The heat generating component heat exchanger 24 and the first air-cooled heat exchanger 34 may be utilized to exchange heat between the heat generating components and the external environment. The heat generating component heat exchanger 24, the first heat exchanger 13 and the second heat exchanger 18 may be utilized to cool the heat generating components by the heat pump system. A proper cooling method may be selected according to the temperature of the external environment while cooling the heat generating components, therefore the dependence on the temperature of the external environment in cooling process is reduced and the cooling effect is ensured while ensuring the reasonable use of the resources. Also, the heat pump device can adjust the temperature of the cabin by use of the in-cabin heat exchanger 23 and the second heat exchanger 18, thus ensuring the control of the temperature in the cabin in case that the heat of the heat generating components may not satisfy the requirement for heating of the cabin and when the temperature of the cabin itself is above a comfortable temperature for the cabin, so that the cabin may always meet the requirement for comfort. In this way, the thermal management system according to the present invention completely solve the problems of heat dissipation of the heat generating components, temperature control of the cabin and reasonable use of the heat, thereby achieving overall management of the heat system of the electric vehicle.

In an embodiment, the heat pump device of the thermal management system according to the present invention may further include: flow path control elements adapted to perform switching of open/close and switching of cooling/heating of the heat pump device when the heat generating component heat exchanger 24 in the heat generating component cooling device exchanges heat with at least one of the in-cabin heat exchanger 23, the first air-cooled heat exchanger 34 and the first heat exchanger 13.

Indeed, the flow path control elements described above may include: a switch element for controlling an on/off state of the compressor 11, and an reversing element for controlling the flowing direction of the refrigerant (which in particular may be a four-way valve 12 or an one-way valve manifolds 15), so as to open or close the heat pump device by changing the state of the switch element and to achieve the switching between cooling and heating of the heat pump device by changing the state of the reversing element.

In particular, the heat pump device may include the compressor 11 (including the switch element), the four-way valve 12, the one-way valve manifolds 15, a throttling element 16 and an accumulator 17. The four-way valve 12 has a first valve port connected to the first heat exchanger 13, a second valve port connected to an outlet of the compressor 11, a third valve port connected to the second heat exchanger 18, and a fourth valve port connected to an inlet of the compressor 11. The one-way valve manifolds 15, the accumulator 17 and the throttling element 16 are connected between the second heat exchanger 18 and the first heat exchanger 13. If the first valve port of the four-way valve 12 communicates with the second valve port thereof, the third valve port of the four-way valve 12 communicates with the fourth valve port thereof. When the first valve port of the four-way valve 12 communicates with the fourth valve port thereof, the third valve port of the four-way valve 12 communicates with the second valve port thereof.

When it is necessary to heat the cabin and cool the heat generating components, the second channel of the first heat exchanger 13 may communicate with the heat generating component cooling device to form a loop and the heat generating component cooling device also communicates with the in-cabin heat exchanger 23 to form a loop. Referring to FIGS. 2, 3 and 5, the four-way valve 12 is set at heating position, the refrigerant flows out along the pipelines under the action of the compressor 11, and passes through the four-way valve 12 and reaches the second heat exchanger 18 in which the refrigerant and the coolant exchanges heat, then after its temperature being increased the coolant transfers the heat into the in-cabin heat exchanger and eventually transfers into the cabin. At the same time, the refrigerant flows through the one-way valve manifolds 15, the accumulator 17 and the temperature of the refrigerant is decreased again when flowing through the throttling element 16, then the low-temperature refrigerant reaches the first channel of the first heat exchanger 13 and exchanges heat with the coolant in the second channel of the first heat exchanger 13 which has already flowed through the heat generating component heat exchange device and absorbed heat, and then in the following circulation the coolant transfers the absorbed heat into the in-cabin heat exchanger 23 for achieving the purpose of cooling and heating and reasonable use of the heat of the heat generating components simultaneously.

In embodiment 6, the first heat exchanger 13 comprises the secondary heat exchanger 131 and the primary heat exchanger 132 connected in series, wherein the second channel of the primary heat exchanger 132 communicates with the first air-cooled heat exchanger 34 to form a loop, the second channel of the secondary heat exchanger 131 is connected with the second air-cooled heat exchanger 41.

In this embodiment, the first air-cooled heat exchanger 34 can be used to cool the coolant and can also be used to regulate the temperature of the refrigerant in the first channel of the primary heat exchanger 132; the second air-cooled heat exchanger 41 can be used to regulate the temperature of the refrigerant in the first channel of the secondary heat exchanger 131. The structures of other components in this embodiment are identical to those in the five embodiments described above.

In this way, on the basis of ensuring the basic function requirements, the heat exchange frequency between the heat pump device and the external environment is improved, thus the adjusting ability of the heat pump device is improved.

In deed, for ensuring the circulation of the coolant in the loop formed by the secondary heat exchanger 131 and the second air-cooled heat exchanger 41, the third power pump 43 is connected at any position in an environment heat exchange loop of the thermal management system provided by the present invention. Preferably, the third power pump 43 is connected in the outlet of the third accumulator 42. At the same time, the third accumulator 42 is provided in the loop for supplying the loss in the circulation and facilitating the expelling of the bubble. Under the action of the third power pump 43, the coolant flows in the environment heat exchange loop, and exchanges heat with the refrigerant in a first channel of the secondary heat exchanger 131 when passing through the second channel of the secondary heat exchanger 131, and then exchanges heat with the air when passing through the second air-cooled heat exchanger 41.

The electric vehicle according to the present invention includes a cabin, heat generating components and the thermal management system described above. The structures of other parts of the electric vehicle are similar to those of the prior art and will not be described further herein.

In the above, the electric vehicle and the thermal management system thereof according to the present invention are described in detail. Herein, the principle and the embodiments of the present invention are depicted with specific examples, and the description of the embodiments mentioned above is only for helping understanding the method and the principle of the present invention. For those skilled in the art, numerous improvements and modifications may be made to the present invention without departing from the principle of the present invention, which also fall into the protection scope of the invention as defined by the claims.

What is claimed is:

1. A thermal management system for an electric vehicle, comprising a device for cooling one or more heat generating components and a heat pump device, a first air-cooled heat exchanger, and an in-cabin heat exchanger wherein
the heat pump device comprises a compressor, a first heat exchanger, a throttling element and a second heat exchanger, which are connected in the sequence listed through a first set of pipelines which form a first loop such that refrigerant is circulated through the first set of pipelines, the heat pump device further comprises a reversing element for controlling a flowing direction of the refrigerant,
wherein the first heat exchanger is a dual channel exchanger having a first channel and a second channel, and the second heat exchanger is a dual channel exchanger having a first channel and a second channel, each of the first and second channels of each of the first and second heat exchangers being sealed and isolated respectively,
wherein the first channel of the first heat exchanger and the second channel of the first heat exchanger are fluidly isolated from each other,
wherein the first channel of the second heat exchanger and the second channel of the second heat exchanger are fluidly isolated from each other,
wherein the first channel of the first heat exchanger and the first channel of the second heat exchanger communicate with other components of the heat pump device through the first set of pipelines, the device for cooling one or more heat generating components communicates with the second channel of the first heat exchanger through a second set of pipelines to form a second loop which can be shut off, the device for cooling one or more heat generating components communicates with the second channel of the second heat exchanger through a third set of pipelines to form a third loop which can be shut off, and the first air-cooled heat exchanger communicates with the device for cooling one or more heat generating components through a fourth set of pipelines to form a fourth loop which can be shut off, the in-cabin heat exchanger communicates with the second channel of the second heat exchanger and the device for cooling one or more heat generating components through a fifth set of pipelines respectively to form a fifth loop which can be shut off, wherein only one of the second, third, fourth, and fifth loops is not shut off at any given time, and then one or more heat generating components can always be cooled.

2. The thermal management system for the electric vehicle according to claim 1, wherein the heat pump device comprises a third heat exchanger which is connected with the second heat exchanger in series, a second channel of the first heat exchanger communicates with the first air-cooled heat exchanger, an accumulator for accumulating the coolant in the second set of pipelines and a pump for pumping the coolant in the second set of pipelines are provided in an inlet pipeline of the second channel of the first heat exchanger, a second air-cooled heat exchanger communicates with a second channel of the third heat exchanger through a sixth set of pipelines to form a sixth loop, and an accumulator for accumulating the coolant in the sixth set of pipelines and the pump for pumping the coolant in the sixth set of pipelines are provided in an inlet pipeline of the second channel of the third heat exchanger;

a first three-way valve is provided in an outlet pipeline of the first air-cooled heat exchanger, a first valve port of the first three-way valve communicates with the outlet pipeline of the first air-cooled heat exchanger, a second valve port of the first three-way valve communicates with an inlet pipeline of the first air-cooled heat exchanger, and a third valve port of the first three-way valve communicates with an inlet pipeline of the device for cooling one or more heat generating components;

the first air-cooled heat exchanger communicates with the second channel of the first heat exchanger through a seventh set of pipelines to form a seventh loop, the inlet pipeline of the second channel of the first heat exchanger communicates with an outlet pipeline of the device for cooling one or more heat generating components, and an outlet pipeline of the second channel of the first heat exchanger communicates with the second valve port of the first three-way valve and the inlet pipeline of the first air-cooled heat exchanger respectively; and a fourth regulating valve is connected between the third valve port of the first three-way valve and the inlet pipeline of the device for cooling one or more heat generating components, and a fifth regulating valve is connected between the outlet pipeline of the device for cooling one or more heat generating components and the inlet pipeline of the second channel of the first heat exchanger.

3. The thermal management system for the electric vehicle according to claim 1, wherein an inlet pipeline of the in-cabin heat exchanger communicates with an outlet pipeline of the second heat exchanger, an outlet pipeline of the in-cabin heat exchanger communicates with the inlet pipeline of the device for cooling one or more heat generating components, an outlet pipeline of the second channel of the second heat exchanger communicates with the inlet pipeline of the in-cabin heat exchanger through a second three-way valve, the inlet pipeline of the device for cooling one or more heat generating components located at the downstream side of the outlet pipeline of the in-cabin heat exchanger communicates with the outlet pipeline of the device for cooling one or more heat generating components through pipelines which can be shut off, and a third valve port of the second three-way valve communicates with the outlet pipeline of the in-cabin heat exchanger through pipelines; and the in-cabin heat exchanger and the device for cooling one or more heat generating components are connected through pipelines with regulating valves, an optional connection between the device for cooling one or more heat generating components and the in-cabin heat exchanger is achieved by the regulating valves, the regulating valves comprise a first regulating valve, a second regulating valve and a third regulating valve, the third regulating valve is provided in the connection pipelines for opening or closing the connection pipelines, the first regulating valve is connected between a first end of the third regulating valve and the inlet pipeline of the device for cooling one or more heat generating components, and the second regulating valve is connected between a second end of the third regulating valve and the outlet pipeline of the device for cooling one or more heat generating components.

4. The thermal management system for the electric vehicle according to claim 1, wherein the device for cooling one or more heat generating components is heat generating component heat exchangers comprising a frequency converter heat exchanger, a battery heat exchanger and an engine heat exchanger which are connected in parallel.

5. A thermal management system for an electric vehicle, comprising a device for cooling one or more heat generating components and a heat pump device, and an in-cabin heat exchanger, wherein the heat pump device comprises a compressor, a first heat exchanger, a throttling element and a second heat exchanger, which are connected in the sequence listed through a first set of pipelines which form a first loop such that refrigerant is circulated through the first set of pipelines, the heat pump device further comprises a reversing element for controlling a flowing direction of the refrigerant, wherein the first heat exchanger is a dual channel exchanger having a first channel and a second channel, and the second heat exchanger is a dual channel exchanger having a first channel and a second channel, each of the first and second channels of each of the first and second heat exchangers being sealed and isolated respectively, wherein the first channel of the first heat exchanger and the second channel of the first heat exchanger are fluidly isolated from each other, wherein the first channel of the second heat exchanger and the second channel of the second heat exchanger are fluidly isolated from each other, wherein the first channel of the first heat exchanger and the first channel of the second heat exchanger communicate with other components of the heat pump device through the first set of pipelines, the device for cooling one or more heat generating components communicates with the second channel of the first heat exchanger through a second set of pipelines to form a second loop which can be shut off, the device for cooling one or more heat generating components communicates with the second channel of the second heat exchanger through a third set of pipelines to form a third loop which can be shut off, and the in-cabin heat exchanger communicates with the second channel of the second heat exchanger and the device for cooling one or more heat generating components through a fourth set of pipelines respectively to form a fourth loop which can be shut off, wherein only one of the second, third, and fourth loops is not shut off at any given time, and then one or more heat generating components can always be cooled.

6. The thermal management system for the electric vehicle according to claim 5, wherein an inlet pipeline of the in-cabin heat exchanger communicates with an outlet pipeline of the second heat exchanger, an outlet pipeline of the in-cabin heat exchanger communicates with the inlet pipeline of the device for cooling one or more heat generating components, an outlet pipeline of the second channel of the second heat exchanger communicates with the inlet pipeline of the in-cabin heat exchanger through a second three-way valve, the inlet pipeline of the device for cooling one or more heat generating components located at the downstream side of the outlet pipeline of the in-cabin heat exchanger communicates with the outlet pipeline of the device for cooling one or more heat generating components through pipelines which can be shut off, and a third valve port of the second three-way valve communicates with the outlet pipeline of the in-cabin heat exchanger through pipelines; and the in-cabin heat exchanger and the device for cooling one or more heat generating components are connected through pipelines with regulating valves, an optional connection between the device for cooling one or more heat generating components and the in-cabin heat exchanger is achieved by the regulating valves, the regulating valves comprise a first regulating valve, a second regulating valve and a third regulating valve, the third regulating valve is provided in the connection pipelines for opening or closing the connection pipelines, the first regulating valve is connected between a first end of the third regulating valve and the inlet pipeline of the device for cooling one or more heat generating components, and the second regulating valve is connected between a second end of the third regulating valve and the outlet pipeline of the device for cooling one or more heat generating components.

7. The thermal management system for the electric vehicle according to claim 5, wherein the device for cooling one or more heat generating components is heat generating component heat exchangers comprising a frequency converter heat exchanger, a battery heat exchanger and an engine heat exchanger which are connected in parallel.

* * * * *